US008947543B2

(12) United States Patent
Battles et al.

(10) Patent No.: US 8,947,543 B2
(45) Date of Patent: Feb. 3, 2015

(54) SYSTEM AND METHOD OF PERSONALIZING A USER INTERFACE OF A PORTABLE ELECTRONIC DEVICE

(75) Inventors: Amy E. Battles, Windsor, CO (US); David J. Staudacher, Fort Collins, CO (US); K. Douglas Gennetten, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2321 days.

(21) Appl. No.: 11/741,334

(22) Filed: Apr. 27, 2007

(65) Prior Publication Data

US 2008/0266407 A1    Oct. 30, 2008

Related U.S. Application Data

(63) Continuation of application No. 10/140,977, filed on May 8, 2002, now abandoned.

(51) Int. Cl.
| | | |
|---|---|---|
| *H04N 5/225* | (2006.01) | |
| *H04N 5/232* | (2006.01) | |
| *G06F 9/44* | (2006.01) | |
| *H04N 5/222* | (2006.01) | |
| *H04N 101/00* | (2006.01) | |

(52) U.S. Cl.
CPC .............. *H04N 5/232* (2013.01); *G06F 9/4443* (2013.01); *H04N 5/23216* (2013.01); *H04N 5/23225* (2013.01); *H04N 2101/00* (2013.01)
USPC .................................. 348/207.11; 348/333.02

(58) Field of Classification Search
USPC .............................. 348/207.1, 207.11, 333.02
See application file for complete search history.

(56) References Cited

U.S. PATENT DOCUMENTS

| | | |
|---|---|---|
| 5,191,373 A | 3/1993 | Nakano et al. |
| 5,298,936 A | 3/1994 | Akitake et al. |
| 5,475,441 A | 12/1995 | Parulski et al. |
| 5,477,264 A | 12/1995 | Sarbadhikari et al. |
| 5,500,711 A | 3/1996 | Sasagaki et al. |
| 5,541,656 A | 7/1996 | Kare et al. |
| 5,541,707 A | 7/1996 | Sasagaki et al. |
| 5,555,064 A | 9/1996 | Machida et al. |
| 5,594,524 A | 1/1997 | Sasagaki et al. |
| 5,606,491 A | 2/1997 | Ellis et al. |
| 5,627,623 A | 5/1997 | Sasagaki et al. |
| 5,634,154 A | 5/1997 | Sasagaki et al. |
| 5,659,822 A | 8/1997 | Sasagaki et al. |
| 5,734,425 A * | 3/1998 | Takizawa et al. .......... 348/231.9 |

(Continued)

OTHER PUBLICATIONS

"ZDNet-UK-News-Story-CES:Fiorina puts industry in the picture about merger," [online] [Retrieved on: Jan. 31, 2002] Retrieved From: http://news.zdnet.co.uk/story/0,,1269-s2102216,00.html.

(Continued)

*Primary Examiner* — Ngoc-Yen Vu
(74) *Attorney, Agent, or Firm* — Fulbright & Jaworski L.L.P.

(57) ABSTRACT

A method of personalizing an interface of a portable electronic device comprises the steps of interfacing the portable electronic device to a workstation, modifying the existing version of the user interface so as to define a personalized version of the user interface, transferring information defining the personalized version of the user interface from the workstation to the portable electronic device, and implementing the personalized version of the user interface on the portable electronic device.

8 Claims, 9 Drawing Sheets

(56) References Cited

U.S. PATENT DOCUMENTS

| | | |
|---|---|---|
| 5,887,096 A | 3/1999 | Du et al. |
| 6,006,039 A | 12/1999 | Steinberg et al. |
| 6,094,221 A | 7/2000 | Andersion |
| 6,161,131 A | 12/2000 | Garfinkle |
| 6,177,957 B1 | 1/2001 | Anderson |
| 6,286,138 B1 | 9/2001 | Purcell |
| 6,903,762 B2 | 6/2005 | Prabhu et al. |
| 6,970,189 B1 * | 11/2005 | Bernstein et al. .......... 348/211.2 |
| 7,173,651 B1 * | 2/2007 | Knowles .................... 348/207.1 |
| 7,304,666 B2 * | 12/2007 | Cazier ....................... 348/211.4 |
| 7,619,762 B2 * | 11/2009 | Chavers et al. .............. 358/1.15 |
| 2001/0033338 A1 | 10/2001 | Hunter |
| 2001/0040685 A1 | 11/2001 | Winter et al. |
| 2003/0025811 A1 * | 2/2003 | Keelan et al. ................. 348/239 |
| 2006/0067654 A1 * | 3/2006 | Herberger et al. ............ 386/120 |

OTHER PUBLICATIONS

"HP announces Photosmart 812 (4 megapizle): Digital Photography Review" [online] [Retrieved on: Jan. 31, 2002] Retrieved from: http://www.dpreview.com/news/0201/02010903hpptotosmart812.asp.

\* cited by examiner

SYSTEM AND METHOD OF PERSONALIZING A USER INTERFACE OF A PORTABLE ELECTRONIC DEVICE

This application is a continuation of prior U.S. patent application Ser. No. 10/140,977 entitled "SYSTEM AND METHOD OF PERSONALIZING A USER INTERFACE OF A PORTABLE ELECTRONIC DEVICE," filed May 8, 2002, the disclosure of which is hereby incorporated herein by reference.

FIELD OF THE INVENTION

The invention is directed to portable electronic devices and more particularly, to personalizing portable devices including a consumer customized user interface.

BACKGROUND OF THE INVENTION

Continuing advances in miniaturization of electronic devices, increases in computation capabilities and decreasing costs to manufacture such devices have lead to a rapid development and availability of electronic devices having advanced capabilities. This technology has not only found its way into existing devices but has made possible new forms of devices, particularly in the consumer area. For example, digital still cameras are supplementing and often replacing conventional photographic film cameras. Portable cassette players are giving way to solid-state MP-3 players capable of storing hours of audio material on a digital memory media. Cellular telephones and pagers increasingly include advance two-way messaging capabilities and provide Internet access.

Typically, such portable electronic devices include an integral display panel in the form of, for example, a Liquid Crystal Display (LCD) and various input devices including, for example, switches, button, cursor positioning devices, compact keyboards, eye position detectors, touch panel overlays, speech recognition capabilities, etc. Using the various input devices provided and the integral display capabilities, a typical portable electronic device enables a user to make various selections for control of the device and processing of data by the device. Typically, this control capability is in the form of software or firmware enabled graphical user interface providing a hierachal menu structure for selection of device specific options.

The user interface enabled by these devices, including the menu structure, cannot only be complicated but confusing to the user. Accordingly, a need exists for an apparatus for and a method of providing an improved user interface.

SUMMARY OF THE INVENTION

According to one aspect of the invention, a method of personalizing an interface of a portable electronic device comprises the steps of interfacing the portable electronic device to a workstation, modifying an existing version of the user interface so as to define a personalized version of the user interface, transferring information defining the personalized version of the user interface from the workstation to the portable electronic device, and implementing the personalized version of the user interface on the portable electronic device.

According to another aspect of the invention, a portable electronic device for performing a dedicated function comprises a portable housing, a display mounted to the housing, an input device mounted to the housing for accepting a manual input, a memory storing a set of program instructions for performing the dedicated function, configuration code defining a user interface, a processor connected to the memory to execute the set of program instructions and responsive to the configuration code for implementing the user interface and a communications interface configured to receive the configuration code for storage in the memory.

According to still another aspect of the invention, a digital camera comprises an optical system for forming an optical image, an image conversion system responsive to the optical image for storing image data, a user interface configured to direct a processing of the image data and a communications interface for receiving user definition data for configuring an operation of the user interface.

According to yet another aspect of the invention, a method of sending electronic images to a recipient comprises the steps of receiving an e-mail address associated with the recipient, transferring a designation of the recipient to an image capture device, capturing an optical image, transforming the optical image into electronic image data, displaying the designation of the recipient on the image capture device, selecting the recipient on the image capture device to receive the electronic image data and initiating a transmission of the electronic image data to the e-mail address.

According to yet another aspect of the invention, a setup program for configuring a user interface of a portable electronic device includes a computer usable medium having computer readable program code embodied therein for configuring the user interface, the computer readable program code comprising computer readable program code for causing a computer to display a menu of selections to be included in the user interface, computer readable program code for causing a computer to respond to a user designating at least one of the selections to be included in the user interface, computer readable program code for causing a computer to generate configuration data enabling the user interface including the at least one of the selections and computer readable program code for causing a computer to upload the configuration code to the portable electronic device.

DETAILED DESCRIPTION OF THE INVENTION

Embodiments of the invention are applicable to a wide range of portable devices including, for example, digital cameras, Personal Digital Assistants (PDA), MP-3 players, wireless and cellular telephone devices, etc. Embodiments of the invention are particularly applicable to, among other environments, devices having relatively small display screens and a limited number and/or type of input devices, e.g., buttons, switches, etc. For the purposes of the present illustrative description of one embodiment of the invention, a digital camera compatible with aspects of the invention is described. However, it should be recognized that embodiments of the present invention are not limited to a particular type of device, a digital camera being but one suitable embodiment.

Figure 1:
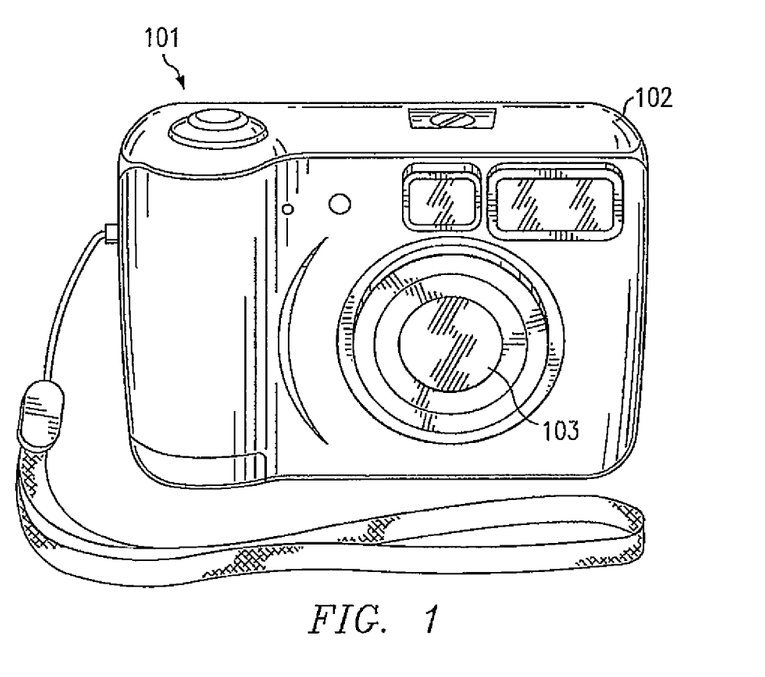
FIG. 1 is a front perspective view of a digital camera compatible with an embodiment of the present invention.

Accordingly, with reference to FIG. 1, a digital camera 101, such as the HP Photosmart™812, includes a portable housing in the form of case 102. The camera may be configured to be operated while being supported and being held by a user such as an average consumer. Digital camera 101 includes an optical system shown as lens 103 for forming an optical image of a subject onto an imager device such as a CCD (not shown).

Figure 2:
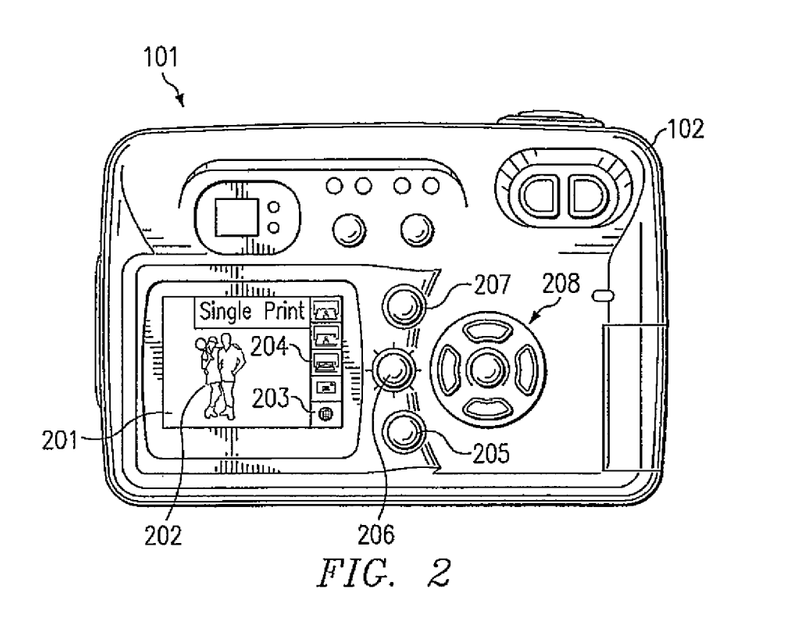
FIG. 2 is a rear view of the digital camera of FIG. 1.

Further features of digital camera 101 are depicted with reference to FIG. 2 showing the back of the camera. In addition to controls for operating the camera including zoom controls, shutter release, focus mode, etc., digital camera 101 includes integral LCD display 201 mounted in or on the back of case 102. Display 201 is operative to display a captured image 202 on all or a portion of display 201 and one or more regions of menus 203 having one or more selectable icons 204. Also mounted to be accessible to a user while holding digital camera 101 are various input devices, in the present example, in the form of manually operable electrical switches including menu button 205, share button 206, display button 207 and four-way processor with "okay" button assembly 208. Operation of the switches is detected by the camera circuitry including, for example, a controller (e.g., a microprocessor) or processor, to provide various menu options and user selection of camera features.

In addition to transfer of data using removable memory cards, digital camera 101 may be interfaced directly to a television monitor or a computer using appropriate interfacing cables and connectors.

Figure 3:
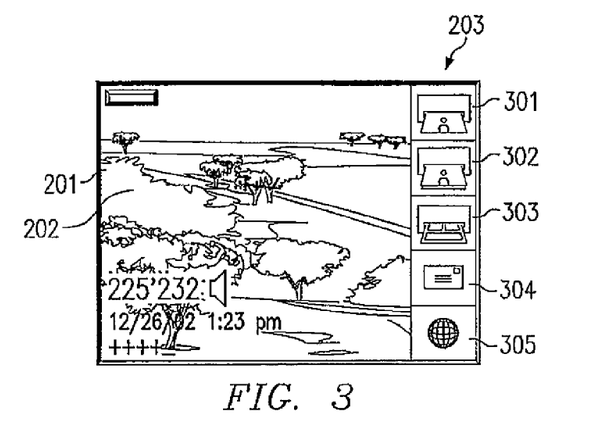
FIG. 3 is a rear view of a display screen integral to the digital camera of FIG. 1 displaying a captured image and a set of icons comprising a menu.
Figure 4:
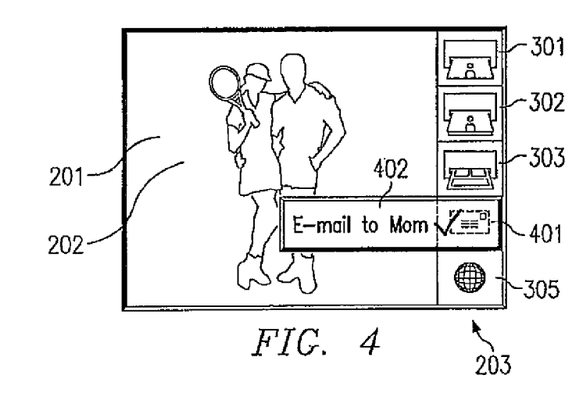
FIG. 4 is a view of a display screen integral to the camera of FIG. 1 illustrating selection of one of the icons.
Figure 5:
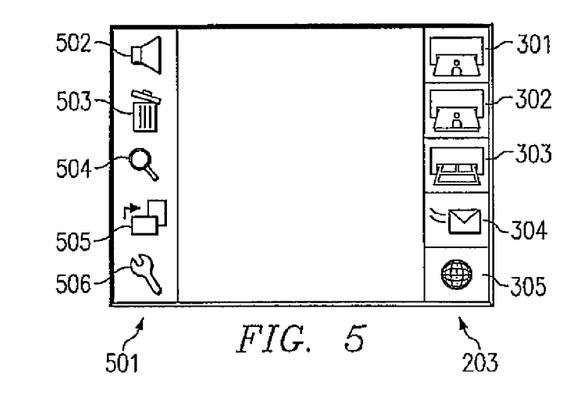
FIG. 5 is a view of a display integral to the digital camera to FIG. 1 displaying menus of icons on either side of the display.

Further details of display 201 may be seen with reference to FIGS. 3-5. Referring to FIG. 3, captured image 202 may be displayed for viewing by a user. The captured image may comprise a live image, an image recently captured, a stored image, slide show, etc. This same display may also be used for system messages. For example, menu 203 may be displayed in response to a user selection, camera operation or other triggering event and may be part of a hierarchical menu tree providing for various operations. Menu 203 may further comprise a share menu designating destinations and/or recipients to receive one or more selected images. Thus, menu 203 may include one or more displayable icons such as print icons 301, print "two copies" icon 302, print to album page icon 303, e-mail icon 304 and post image to website icon 305. This share menu is, according to one embodiment in the invention, configured by a user while personalizing the interface including selection of specific destinations and/or recipients to be included in the camera sharing menu. Transmission of images to a designated destination an/or recipient may be accomplished by a wired or wireless connection from the camera to a PC, directly to a LAN, or Internet Service Provider (ISP) providing Internet and/or e-mail connectivity. Wired connections may use a suitable connector and cable, phone jack, etc., as required. Wireless connection may be supported by a Bluetooth, cellular telephone, or similar radio frequency transceiver and any required interface (e.g., modem).

Share menu functions, as but one example of a user interface feature, may include numerous and varied options such as, for example and without limitation, printing a variable number of copies of a particular image, printing an index sheet, saving images to a folder on a PC, saving and/or creating a CD containing the images, downloading to an electronic picture frame either directly or via the Internet, transmission to a service bureau for printing, etc.

Because of the large number of selections possible and/or the desirability of personalizing a selection (e.g., designating the specific recipients and their e-mail addresses, designation of preferred service bureaus, writing an introductory message or note to form part of an e-mail message forwarding an image, etc.), one embodiment of the invention provides for user customization of the menus and/or other features and functionalities forming the user interface. Although customization of the user interface to personalize the digital camera may include selection and/or configuration of features associated with various icons and functions, other aspects of the user interface may also be customized included, for example, default modes, button functions, etc. Customization of the user interface may be performed by downloading appropriate software to a memory of the digital camera (or other suitable platform) including, for example, (i) program instructions enabling the camera to perform its dedicated function of taking pictures, (ii) downloading of only the configuration code for implementing the user interface (e.g., a portion of the program instructions), or (iii) a separate script or configuration file including parameters to configure digital camera device features, the "customization" file being read by the program code so as to implement a personalized user interface.

Selection of a particular icon and its associated function (e.g., designating an e-mail recipient of an image in the case of share menu 203) may be accomplished by use of 4-way processor with "okay" button assembly 208 (FIG. 2). Selection of a particular icon, such as activated e-mail icon 401, may result in additional information being displayed such as tag 402 displaying a designation of a recipient associated with the selected icon. Multiple icons may be configured to provide for corresponding recipient addresses or features. Thus, with reference to FIG. 5, share menu may include features represented by selectable buttons or icons 301-305 as previously described. In addition to providing for definition and configuration of the illustrated share menu, other functions may be customized by the user according an embodiment of the invention. For example, main menu 501 may be configured to include playback functions as represented by play icon 502, delete icon 503, magnify icon 504, rotate icon 505 and setup icon 506. Each of these icons may call appropriate sub menus to provide for further user selection and control. Again, the content, look and feel, functionality, placement, and other features of main menu 501 may be defined by the user employing a separate system according to an embodiment of the invention.

Figure 6:
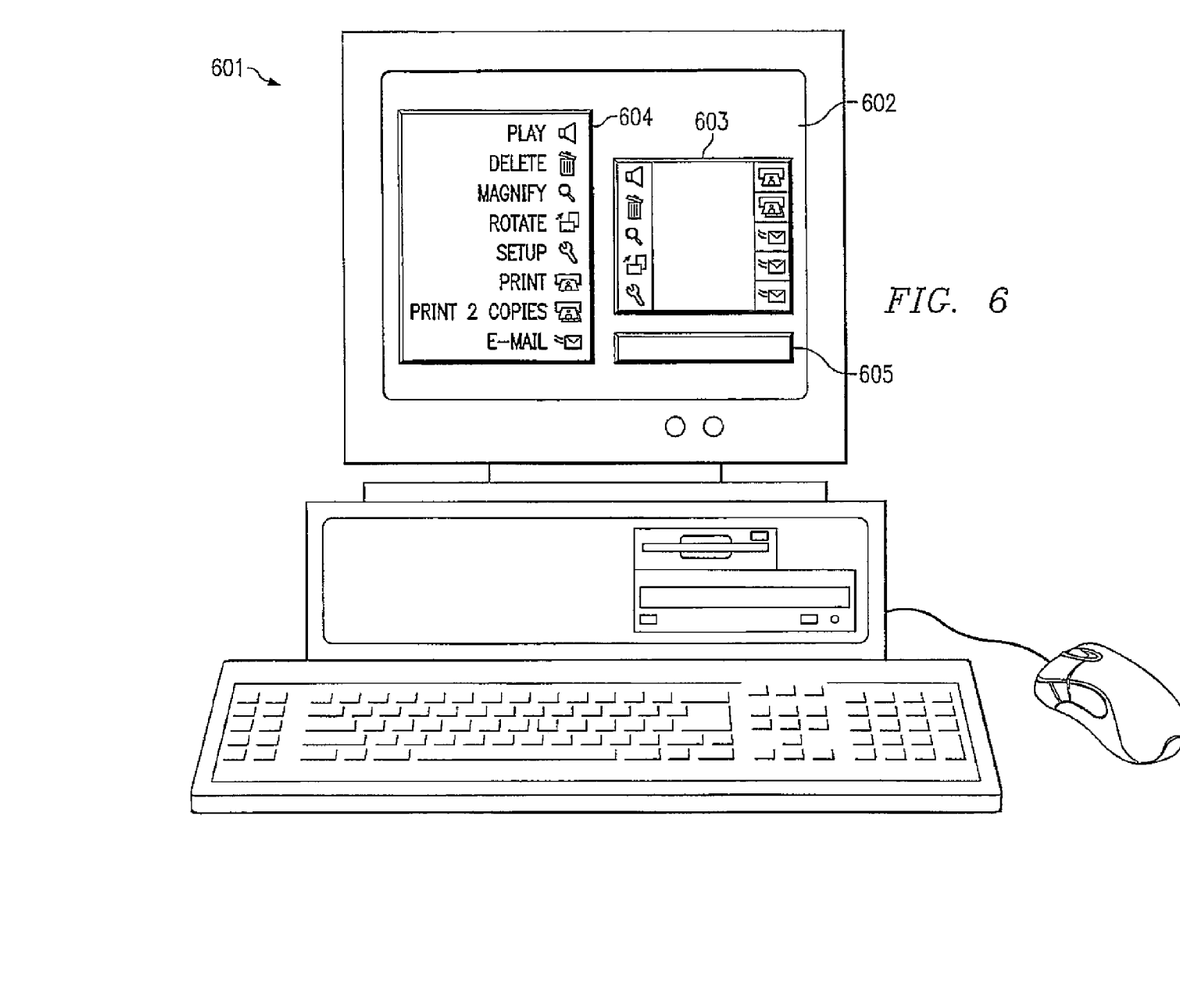
FIG. 6 is a front view of system executing configuration software for personalizing a digital camera interface according to an embodiment of the invention.

A platform for executing a set-up program to generate the required configuration data, configuration files, etc. is shown in FIG. 6. Referring to FIG. 6, Personal Computer (PC) 601 includes a monitor providing display 602 on which is displayed simulation 603 of a user interface including, for example, an arrangement of function controls and associated icons for one or more menus. Also displayed is an options menu 604 including selectable functions and icons for inclusion in particular menus to be part of the user interface. In addition to the options menu, input field 605 may be included for entry of textual information such as, for example, e-mail addresses and associated names of recipients, ftp and websites for service bureaus, folder names and location, etc.

Figure 7:
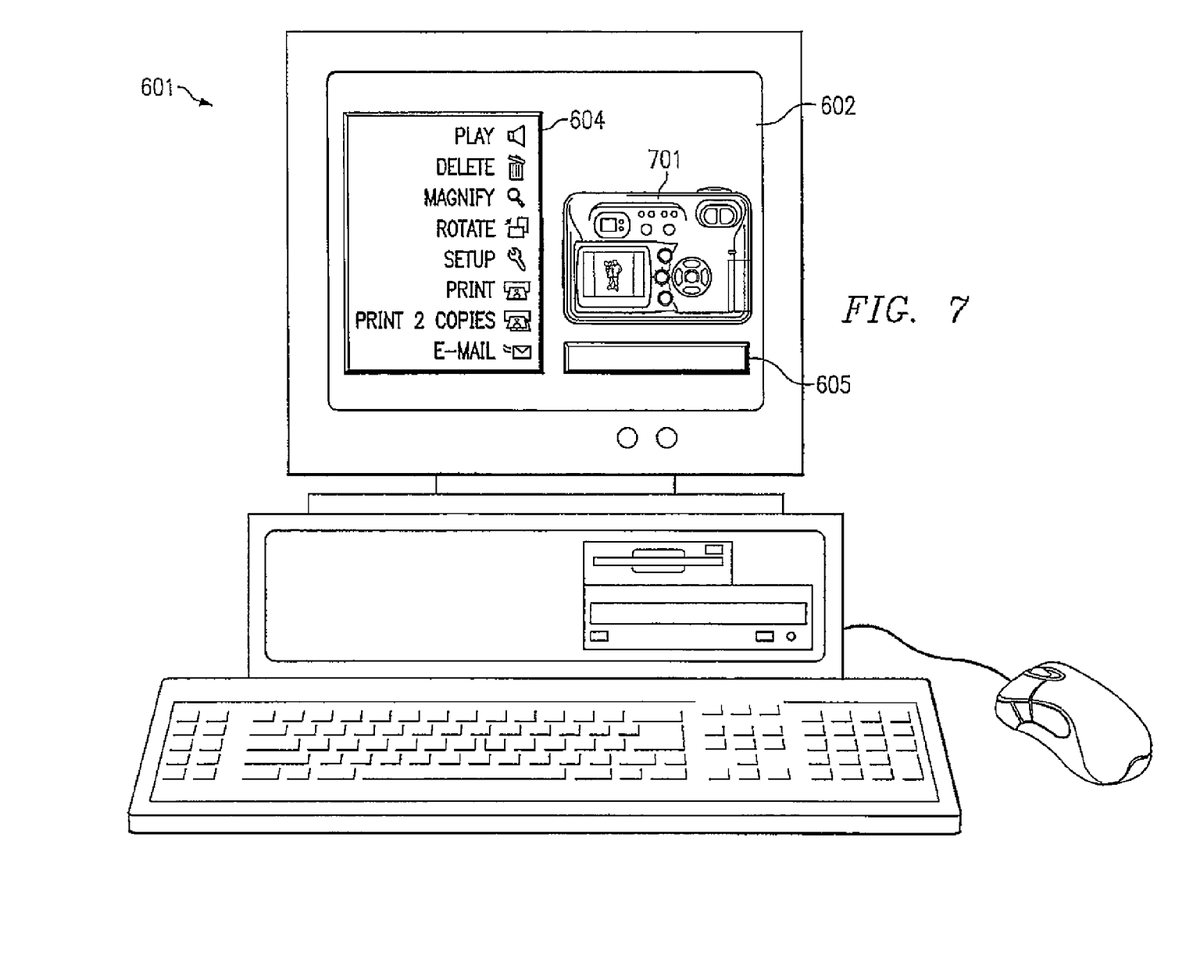
FIG. 7 is a front view of a system for configuring software for personalizing a digital camera including a simulation of the digital camera as personalized according to an embodiment of the invention.

In addition to incorporating a facsimile of the digital camera's display, on which a user may drag and drop selected icons to enable associated functions, the set-up program may further include a simulation capability. For example, referring to FIG. 7, simulation 701 of a digital camera may allow a user to interact with the simulation to personalize a digital camera or other device and allow the user to exercise and test the proposed configuration. The simulation may further be used to provide familiarity with and training on the device being configured.

Figure 8:
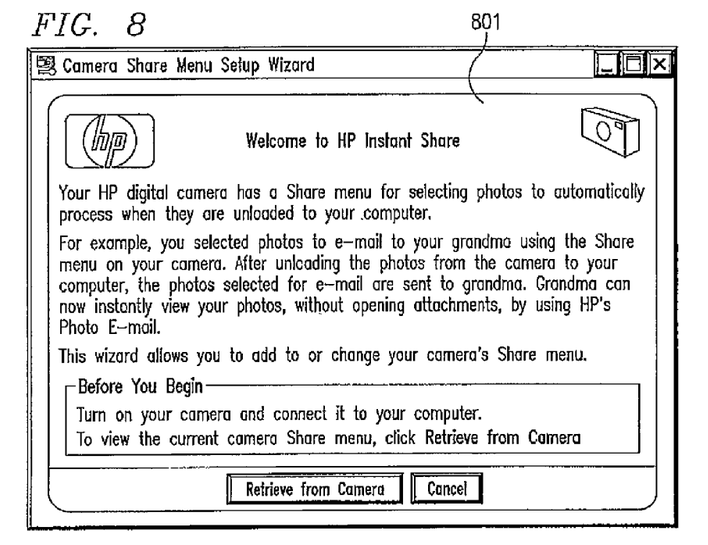
FIG. 8 is a view of a display generated by configuration software for personalizing a digital camera user interface according to an embodiment of the invention.
Figure 9:
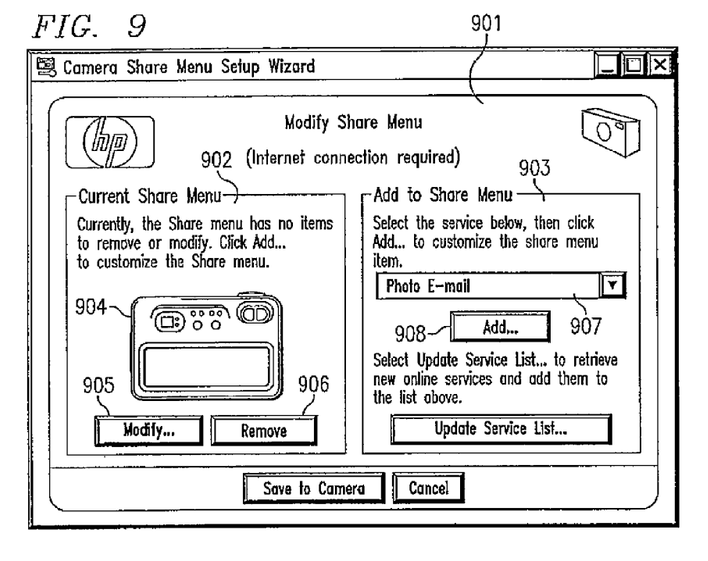
FIG. 9 is a view of a display generated by configuration software used to personalize a digital camera user interface providing for selection of camera features to be incorporated into a menu.

Another form of set-up program according to an embodiment of the invention is shown in FIGS. 8 and 9 in the form of a "wizard", i.e., a step-by-step set of instructions or screens that direct the user through the procedures of customizing menus and the user interface. FIG. 8 illustrates an initial camera setup wizard screen 801 for customizing a user interface. FIG. 9 depicts "modify share menu" 901 that provides facilities for displaying the current contents of a current share menu (area 902) and providing for the addition (area 903), modification (modify action button 905) and deletion (remove action button 906) of selected items to and from the menu. The modify share menu 901 depicted in FIG. 9 provides current share menu area 902 depicting items already included in the share menu currently resident on a digital camera. Any existing share menu items are displayed in camera graphic 904 including a simulation of the target digital camera. Camera graphic 904 depict the target digital camera in a slightly modified form to provide appropriate display areas, such as by depicting an LCD display larger than in the physical camera to enhance viewing of the simulation. Included in the current share menu area 902 are action buttons to allow the modification (modify action button 905) and/or deletion (remove action button 906) of items appearing in and selected using a display portion of camera graphic 904. Another area of modify share menu 901 includes add to share menu area 903 in that a user may designate a new item to be included in the share menu using pull-down menu area 907. Add action button 908 allows a user to incorporate the selected item into the share menu.

Figure 10:
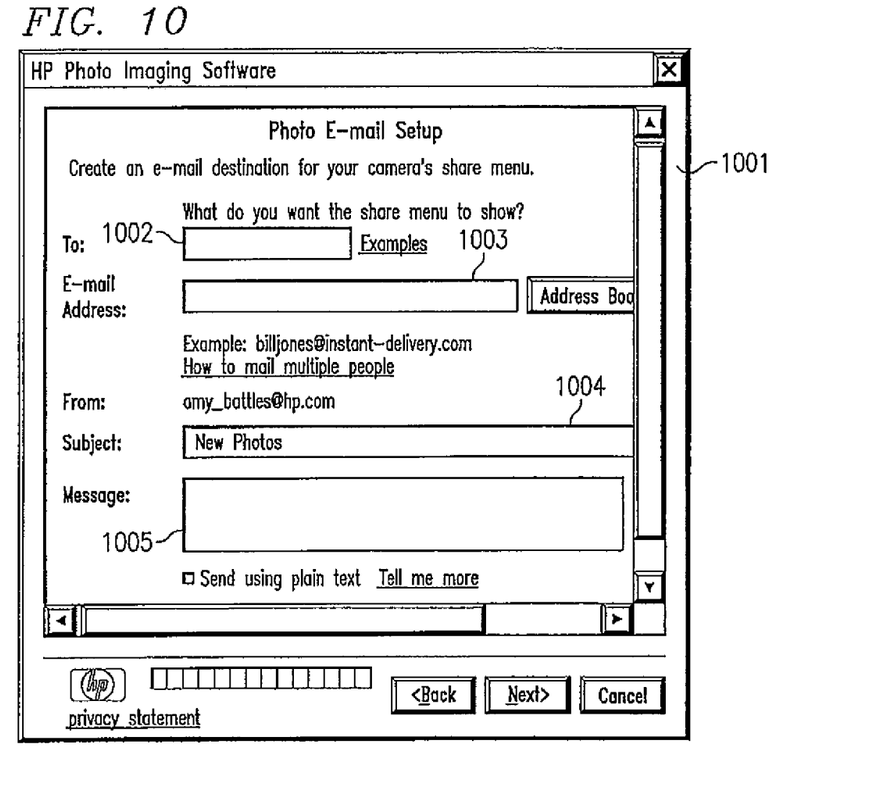
FIG. 10 is a view of a display requesting e-mail information associated with a selectable e-mail destination to be added to customized menu of a digital camera.

In those cases where additional information is required to add a particular function, the user is guided through the required steps to provide additional information. For example, referring to FIG. 10, in the case of adding an e-mail address to the share menu, a user might be presented with an entry screen 1001 requesting additional information to enable e-mail transmission of image data to a desired destination. For example, in the case of e-mail, the user may be requested to enter in text entry area 1002 a label or title to be associated with and displayed on the digital camera designating a particular destination. Thus, the text associated with e-mail icon 401 and tag 402 (FIG. 4) "E-mail to Mom" may be entered to be associated with the e-mail address to be entered in text entry area 1003. Input on entry areas 1004 and 1005 request further information to be included in an e-mail associated with the corresponding e-mail address including, for example, a subject line and a short message to be included as part of an e-mail when forwarding images using the share menu.

Figure 11:
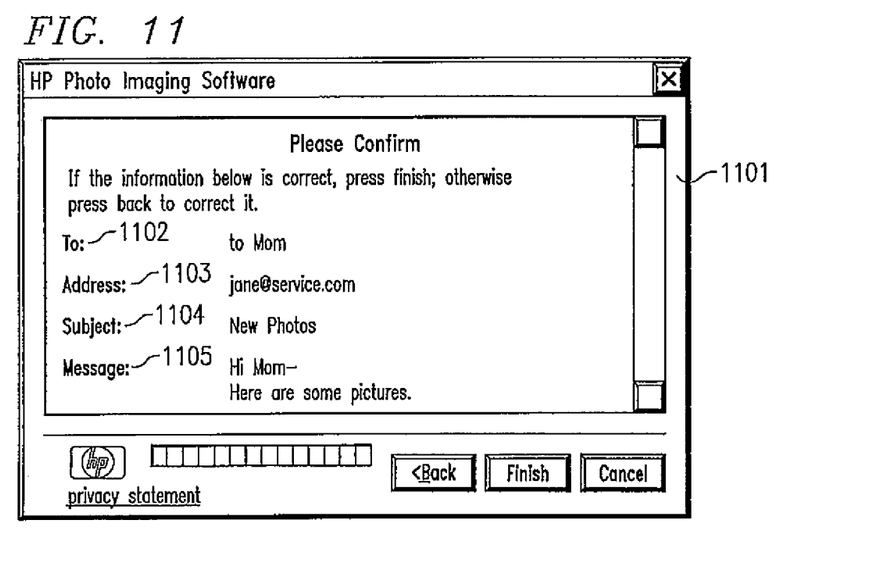
FIG. 11 is a view of a confirmation screen generated by configuration software.

FIG. 11 illustrates confirmation screen 1101 displaying to the user data provided using the photo e-mail set-up screen 1001 (FIG. 10) including, for example, the label to be associated with the destination ("to" field 1102), the associated e-mail address ("address" field 1103), e-mail subject field 1104 and a short message to be incorporated into the body of the e-mail message as displayed in message field 1105.

Figure 12:
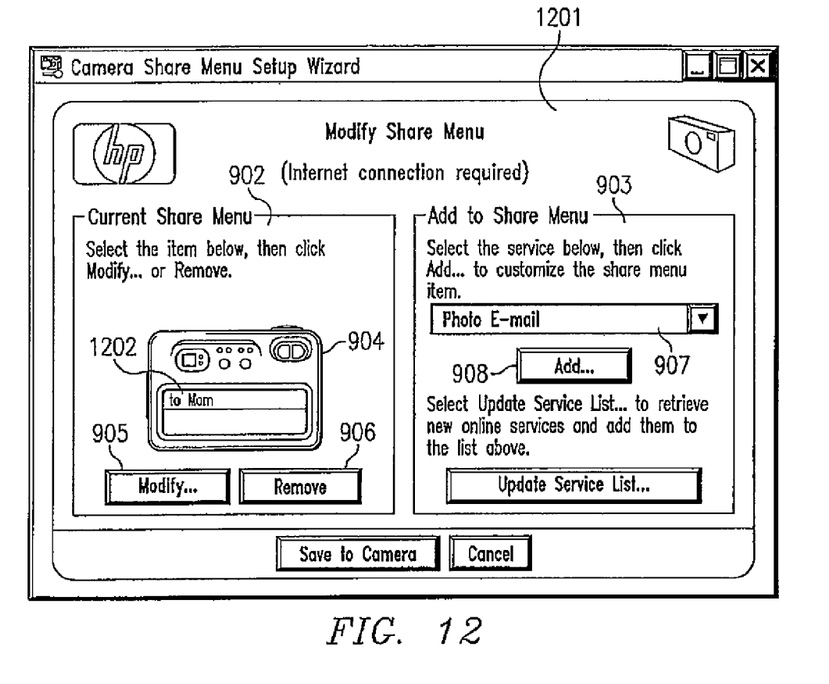
FIG. 12 is a view of a screen generated by configuration software enabling user viewing and modification of features provided by a digital camera user interface.

FIG. 12 is a screen view of camera share menu set-up wizard 1201 depicting one or more items 1202 present in the current share menu. These items may have been recently added or part of a previously created and current (i.e., prior to modification) share menu.

Figure 13:
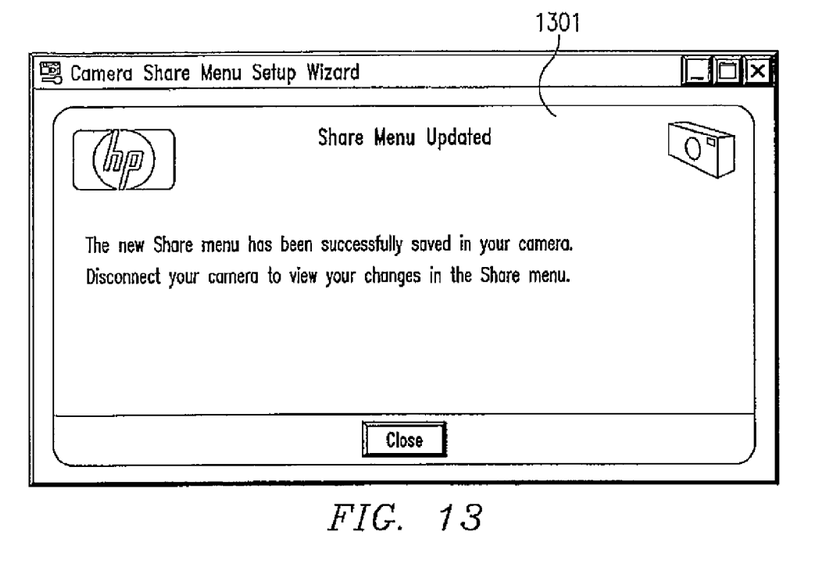
FIG. 13 is a view of a status screen generated by configuration software notifying a user that a menu portion of a user interface was successfully update.

Completion and verification of share menu updating is depicted in FIG. 13 wherein camera share menu set-up wizard screen 1301 informs a user that the share menu has been saved to the target camera and may include other instructions to the user such as instructions to disconnect the camera to view the changes in the share menu. Additional screens may be provided to customize other aspects of the menu and/or to enter information related to designated items such as associated e-mails addresses, etc. The set-up wizard may further include facilities for uploading the appropriate configuration data to the camera so as to enable the user interface as personalized by the user.

Figure 14:
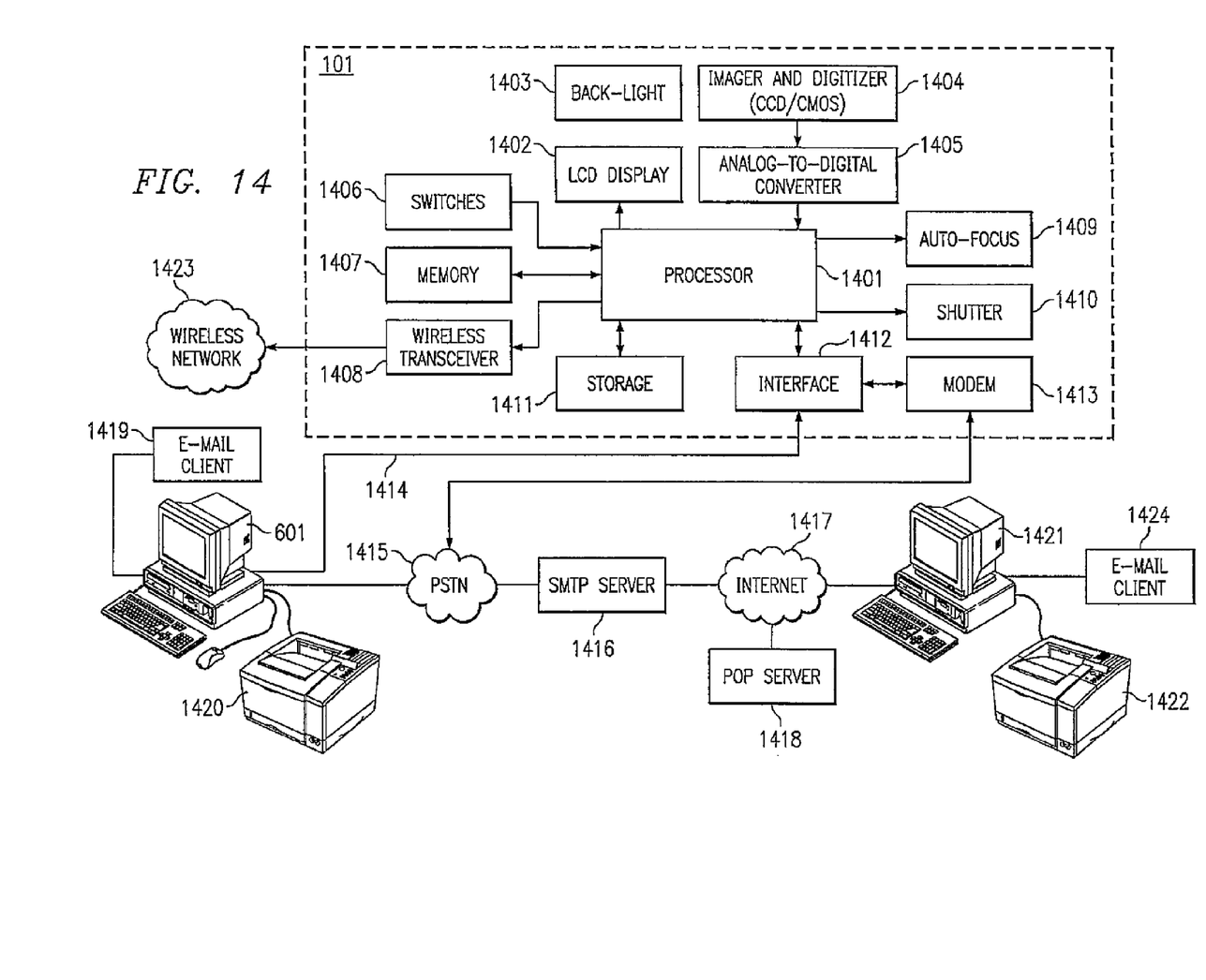
FIG. 14 is a block diagram of a digital camera connected to a computer system for configuring the camera and providing access to a network for transmission of image data to selected destinations.

A block diagram of a system according to an embodiment of the invention is shown in FIG. 14 including digital camera 101 and various devices and infrastructures with which it interfaces. Digital camera 101 includes a controller or processor 1401 that may be dedicated to executing software or firmware providing the dedicated functionality of the digital camera, i.e., functions required to capture, store and transmit an image. Processor 1401 may have sufficient resources to allow for personalization of the user interface or other features of the camera. Connected to processor 1401 is LCD display 1402 that may be illuminated by backlight 1403. A suitable optical system of lenses (not shown) may project an image onto imager and digitizer 1404 that provides a corresponding signal to analog-to-digital converter 1404, the combination forming an image conversion system to provide image data to processor 1401. The image data, typically in the form of a bit-map image, may be temporally stored in memory 1407 for display on LCD display 1402 and processing by processor 1401. This processing may include, for example, lossy compression of the image (e.g., JPEG encoding) and/or reformatting for storage in storage device 1411 (e.g., e-mail address, printer, etc.).

User control of digital camera 101 is enabled by switches 1406 to which processor 1401 responds by implementing a selected function and/or displaying an appropriate menu, image, etc. on LCD display 1402. For example, in response to a user activating a shutter release button, processor 1401 may activate auto-focus circuitry and/or mechanism 1409 to properly adjust the optical system (e.g., focus the camera lens) and activate shutter 1410 to capture an optical image onto imager and digitizer 1404.

In addition to viewing of stored images, a user may designate one or more recipients to receive selected images. In this case, processor 1401 may itself encode image data stored in storage device 1411 for transmission and provide the encoded image data to interface 1412 for transmission over communications interface 1414 or PC 601. PC 601 may include an appropriate e-mail client 1419 to compose and transmit an e-mail message. A designation of the intended e-mail recipient may be associated with the image data, PC 601 associating the e-mail recipient with an appropriate e-mail address. Alternatively, if digital camera 101 includes a direct interface to an appropriate e-mail server, then it may include an appropriate e-mail client function and associate the image data with the associated e-mail address of the recipient for direct transmission to the server. Alternatively, PC 601 may transfer the image data and associated recipient information to an Internet-based server, that then composes and transmits the e-mail message.

Digital camera 101 may be interfaced to PC 601 using an appropriate interfacer such as a USB Port. Similarly, interface 1412 may also be USB compatible. In turn, computer 601 may route image data received from digital camera 101 to the designated recipients. In the present example, computer 6012 is connected to public switched telephone network (PSTN) 1415 and appropriate e-mail systems supported by SMTP server 1416 for transmission of image data as an attachment to an e-mail message. Alternatively, rather than transmit large amounts of data associated with a high resolution image as an attachment to an e-mail, a low resolution "thumb-nail" version of the image may be sent via e-mail. In this case, the e-mail message may include a line (e.g., a uniform resource locator or "URL") for accessing the full resolution image that could be stored, for example, on an appropriate server.

In the present example, SMTP server 1416 is connected to Internet 1417 that routes the image data to POP server 1418 associated with a particular e-mail client 1424 of the selected recipient. As another example, designation of a remote printer may be accomplished in a similar manner by sending an appropriate message to computer system 14231 for printing using remote printer 1422. Conversely, local printing may be accomplished using printer 1420 attached directly to computer 601.

Digital camera 101 may further include facilities for direct connections to various communications systems. For example, digital camera 101 may include integral model 1413 that may be directly connected to an appropriate communications system such as a local area network, or in the present example, directly to the PSTN providing dial up access to SMTP server 1416. Thus, digital camera 101 may be connected directly to a telephone line to e-mail image data to a recipient such as a designated individual, service bureau or other remote device. Digital camera 101 may further include a wireless transceiver 1408 for connecting to a wireless network 1423. Wireless transceiver 1408 may be compatible with one or more wireless systems including, for example, cellular telephone, CDPD, Bluetooth, etc.

Figure 15:
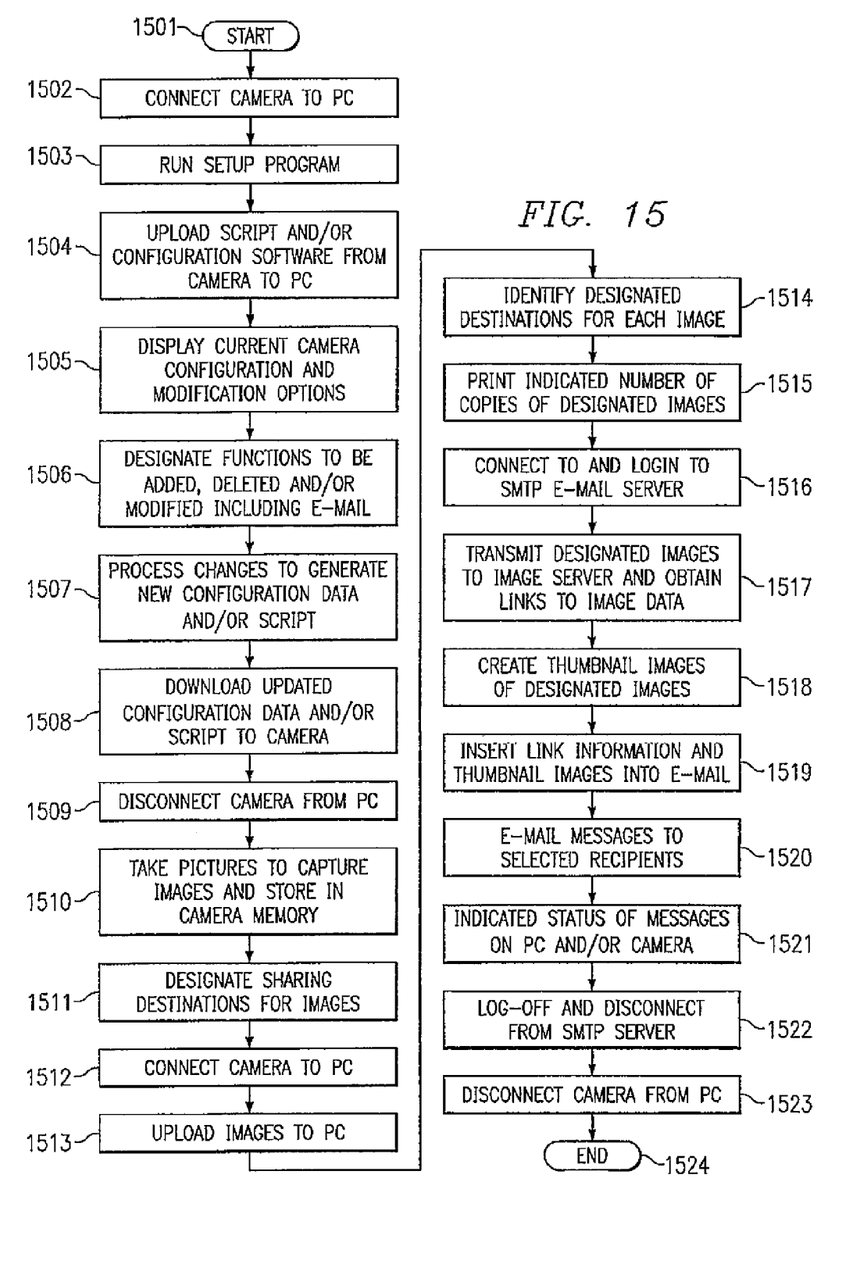
FIG. 15 is a flow chart of a method of personalizing a digital camera user interface according to an embodiment of the invention.

A method according to an embodiment of the invention is depicted by the flowchart of FIG. 15. Starting at 1501, at step 1502 a connection is established between the digital camera and a PC running appropriate setup program initiated at step 1503. At step 1504 script and/or configuration software is uploaded from the camera to the PC to enable viewing of the current configuration and features supported by the camera. Thus, at step 1505, current camera configuration and modification options are displayed and, at step 1506, a user may designated functions to be added, deleted and/or modified including designation of e-mail recipients with their e-mail address and appropriate label designations. Alternatively, this information may be retained in the PC thereby avoiding the need to download configuration information from the camera or a default "standard" configuration may be used as a starting point of the configuration process. Alternatively, this information may be stored on an Internet-based server thereby making it accessible from multiple computers. Although not shown, as previously described, other share type information may further be providing including, for example, printers and print options, web servers and web page addresses to which image data may be uploaded, folders or directories for storage of image data, names and addresses of service bureaus, etc.

At step 1507 changes made to the user interface at step 1506 are processed so as to generate new configuration data and/or a new script to implement the desired functions and configuration of the user interface. This updated configuration data and/or script is then downloaded from the PC to the camera at step 1508 and, upon verification of a successful download, the digital camera may be disconnected from the PC at step 1509. Alternatively to transmission over a wired connection, other media and methods may be used to download to the camera including, for example, a wireless connection (e.g., radio, infrared, etc.) and insertion and/or replacement of a physical media within the camera such as a memory card or "stick." At this point, if necessary, the digital camera may be rebooted to initialize and enable the reconfigured and personalized user interface or other functionality provided by the configuration data and/or script.

At step 1510, the digital camera may be operated in its normal operating mode so as to take pictures by capturing images and storing the associated image data in camera memory. Once stored, the user may use the personalized user interface to designate sharing destinations to receive the images at step 1511. Upon connecting the camera to the PC at step 1512, the image data is uploaded to the PC from the digital camera at step 1513 and, at step 1514, designated destinations associated with respect of ones of the images are identified by the PC. Again these destinations may include a wide range of potential recipients including, for example, a printer such that, at step 1515, a desired number of copies of an image are printed. In the case of an e-mail transmission, step 1516 provides for connection and login to an SMTP e-mail server. Note that part of the configuration information may include data necessary to perform the login including, for example, server address, account information, pin or password, etc.

Transmission of the designated images may be accomplished using a variety of methods including, for example, by incorporating the image data into or attaching it to an e-mail message addressed to a designed destination and/or by using some intermediary server and providing notice to an intended destination that the image has been stored for their retrieval. Consistent with this latter method, at step 1517 the designated images are transmitted to an appropriate server to provide for their retrieval by the intended recipients as an alternative to direct mailing of the images. Providing access to the images by uploading to a server avoids the transmission of large image files as attachments, a process that may be time consuming and limited to smaller file sizes. Access may be provided, for example, by posting the images on a secure website that may require a password to obtain access. Step 1518 creates low-resolution thumbnail images of the designated images. The thumbnail images together with the corresponding link information may be incorporated into an e-mail at step 1519 together with any messages to the recipient and passwords required to access the images. The e-mail is then send to the selected recipient(s) at step 1520. While direct e-mail and transmission to a server have been described, such is by way of illustration only of a function subject to user customization using an embodiment of the present invention to create a custom user interface.

Step 1521 provides an indication of the status of the messages, either on the PC or on the digital camera itself. Upon successful transmission of the e-mail, a logoff and disconnect from the SMTP server is performed at step 1522 and, at step 1523, the camera may be disconnected from the PC, the method ending at step 1524.

As previously mentioned, although transmission of image data may be accomplished by posting the image data on a server and providing links to the image data, other methods of transmitting the image data may also be used including, for example, transmission of the original image data directly as one or more attachments to one or more e-mail messages. Further, although the configuration of the user interface has been described in terms of downloading of a configuration file and/or a script, an entirely new set of software or portion of software may be downloaded to the digital camera instead. Further, other features of the user interface may be defined according to embodiments of the present invention including, for example, display background color, fonts, features appearing in a menu, favorites, etc. Further, the order of a particular options may be defined to personalize the user interface. Still further, various "skins" may be implemented to customize the camera display.

It is further understood, that while an embodiment of the invention has been described in terms of a digital camera, other embodiments of the invention may be applied to electronic devices in general including, but not limited to, other portable and/or interactive devices so as to personalize those devices including, for example, MP-3 players, PDAs, cellular telephones, two-way pagers, Global Positioning Systems (GPS) devices, etc.

The invention claimed is:

1. A method of personalizing an interface of a portable electronic device comprising the steps of:
   interfacing the portable electronic device to a workstation;
   retrieving an existing version of a user interface from the electronic device;
   modifying the existing version of said user interface so as to define a personalized version of said user interface;
   transferring information defining said personalized version of said user interface from said workstation to the portable electronic device; and
   implementing said personalized version of said user interface on the portable electronic device.

2. The method according to claim 1 further including the steps of:
   displaying on said workstation an indication of features implemented by said existing version of said user interface.

3. The method according to claim 2 wherein said step of displaying includes providing a graphical depiction of a simulation of said current version of said user interface on said workstation.

4. The method according to claim 2 further including the steps of:
   transferring information defining said existing version of said user interface resident on the portable electronic device from the portable electronic device to said workstation.

5. The method according to claim 1 further including executing an interface personalization program specific to the portable electronic device on said workstation.

6. The method according to claim 1 wherein said step of modifying includes (i) providing a graphical depiction of said current version of said user interface on said workstation, (ii) providing a menu of selectable features for possible inclusion in said personalized version of said user interface, and (iii) incorporating selected ones of said features into said personalized version of said user interface.

7. The method according to claim 1 wherein said step of modifying includes a step selected from the group comprising (i) adding a new feature to said existing version of said user interface, (ii) deleting an existing feature from said existing version of said user interface, and (iii) modifying an existing feature of said existing version of said user interface.

8. The method according to claim 1 wherein said user interface comprises a graphical user interface including a plurality of displayable icons associated with respective selectable features implemented by the portable electronic device.

* * * * *